(12) United States Patent
Li (10) Patent No.: US 12,261,973 B2
(45) Date of Patent: Mar. 25, 2025

(54) DISPLAY PANEL AND MOBILE TERMINAL

(71) Applicant: Wuhan China Star Optoelectronics Semiconductor Display Technology Co., Ltd., Wuhan (CN)

(72) Inventor: Jiang Li, Wuhan (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 17/621,593

(22) PCT Filed: Dec. 14, 2021

(86) PCT No.: PCT/CN2021/137964
§ 371 (c)(1),
(2) Date: Dec. 21, 2021

(87) PCT Pub. No.: WO2023/097775
PCT Pub. Date: Jun. 8, 2023

(65) Prior Publication Data
US 2024/0195900 A1 Jun. 13, 2024

(30) Foreign Application Priority Data
Dec. 1, 2021 (CN) .......................... 202111451824.7

(51) Int. Cl.
*H04M 1/18* (2006.01)
*H04M 1/02* (2006.01)
*H04W 88/02* (2009.01)

(52) U.S. Cl.
CPC ......... *H04M 1/185* (2013.01); *H04M 1/0237* (2013.01); *H04M 1/0268* (2013.01);
(Continued)

(58) Field of Classification Search
CPC .................... H04W 88/00–06; H04M 2250/12
See application file for complete search history.

(56) References Cited

U.S. PATENT DOCUMENTS 7,059,182 B1   6/2006  Ragner
8,462,103 B1 *  6/2013  Moscovitch ........... F16M 13/02
                                                    345/55

(Continued)

FOREIGN PATENT DOCUMENTS

CA    2889462 A1   9/2016
CN    105847471 A  8/2016
(Continued)

*Primary Examiner* — San Htun
(74) *Attorney, Agent, or Firm* — PV IP PC; Wei Te Chung (57) ABSTRACT

A display panel and a mobile terminal are disclosed. The display panel includes a pivot cover. An impact resistant structure is embedded in the pivot cover. The impact resistant structure includes a gravity sensing assembly and a telescopic assembly. The telescopic assembly includes a telescopic block. The impact resistant structure drives the telescopic block to switch between a contracted state and an elongated state through whether the gravity sensing assembly is forced by an external force, so that the telescopic block is switching between spaced from the frame body and abutted against the frame body, thereby making the impact resistant structure switch between a first state and a second state.

20 Claims, 9 Drawing Sheets

(52) U.S. Cl.
CPC .......... *H04W 88/02* (2013.01); *H04M 1/0216* (2013.01); *H04M 2250/12* (2013.01)

(56) References Cited

U.S. PATENT DOCUMENTS

| | | | |
|---|---|---|---|
| 2009/0054101 A1* | 2/2009 | Pan | H04M 1/0237 455/556.1 |
| 2012/0050969 A1* | 3/2012 | Crohas | G06F 1/1626 361/679.01 |
| 2014/0031088 A1* | 1/2014 | Nakamura | G06F 1/1624 455/566 |
| 2019/0327350 A1* | 10/2019 | Li | H04M 1/0285 |

FOREIGN PATENT DOCUMENTS

| | | |
|---|---|---|
| CN | 106657462 A | 5/2017 |
| CN | 110035147 A | 7/2019 |
| CN | 210518451 U | 5/2020 |
| CN | 213028179 U | 4/2021 |
| CN | 113064468 A | 7/2021 |
| CN | 113066380 A | 7/2021 |
| DE | 212020000153 U1 | 10/2020 |
| JP | 2009132182 A | 6/2009 |
| JP | 3203650 U | 4/2016 |
| WO | 2021197172 A1 | 10/2021 |

* cited by examiner

DISPLAY PANEL AND MOBILE TERMINAL

CROSS-REFERENCE TO RELATED APPLICATION

This application is a national phase application under 35 U.S.C. § 371 of PCT Application No. PCT/CN2021/137964 filed Dec. 14, 2021, which claims priority to Chinese Application No. 202111451824.7 filed Dec. 1, 2021, the contents of which are incorporated herein by reference in their entirety.

FIELD OF INVENTION

The present disclosure relates to a field of display, and more particularly to a display panel and a mobile terminal.

BACKGROUND OF DISCLOSURE

Currently, a foldable mobile device is usually set with a support mechanism, which is usually a rotating mechanism connecting two parts of a middle frame, and a flexible screen is set on the support mechanism to implement the closing or unfolding of the foldable mobile device, but in the closed state or the unfolded state when the foldable mobile device falls from a height and the pivot cover first touches the ground and forced by an impact force, the impact force will be transmitted to the rotating mechanism through the pivot cover of the rotating mechanism (the pivot cover is only connected to the middle frame through the rotating assembly) and then to the middle frame. When the rotating mechanism is forced by the impact force, it is prone to unsatisfactory issues, such as derailment of pivot, broken shaft, and bent track, which will affect the folding function of the foldable mobile device and eventually affect the normal folding of the mobile phone and reduce the user experience.

SUMMARY OF INVENTION

Technical Problem

An embodiment of the present application provides a display panel and a mobile terminal to solve the problem that when the pivot cover first touches the ground and forced by an impact force, the impact force will be transmitted to the rotating mechanism through the pivot cover of the rotating mechanism (the pivot cover is only connected to the middle frame through the rotating assembly) and then to the middle frame. When the rotating mechanism is forced by the impact force, it is prone to unsatisfactory issues, such as derailment of pivot, broken shaft, and bent track, which will affect the folding function of the foldable mobile device and eventually affect the normal folding of the mobile phone and reduce the user experience.

Technical Solutions

In order to solve the above problem, the present application provides technical solutions as following.

An embodiment of the present application provides a display panel, wherein the display panel comprises:
a support structure comprising a frame body and a rotating assembly, wherein the frame body and the rotating assembly are relatively and rotatably connected, and the rotating assembly has a pivot cover disposed outside the rotating assembly;
a display panel body disposed on the frame body; and
an impact resistant structure embedded in the pivot cover, wherein the impact resistant structure comprises a gravity sensing assembly and a telescopic assembly, the gravity sensing assembly and the telescopic assembly are transmittably connected, the telescopic assembly comprises a telescopic block, and the telescopic block and the frame body are disposed opposite to each other, wherein the impact resistant structure is configured to be switched between a first state and a second state, the telescopic block is in a contracted state and spaced from the frame body in the first state, the telescopic block is in an elongated state and abutted against the frame body in the second state, and the gravity sensing assembly is used to drive the telescopic block into the elongated state while being forced by an external force, so that the impact resistant structure is switched from the first state to the second state.

In an embodiment, the gravity sensing assembly and the telescopic assembly are transmittably connected by a transmission assembly;
the impact resistant structure comprises a housing, the housing comprises a first slideway extending along a first direction, a second slideway extending along a second direction, and a third slideway extending along a third direction, the first slideway communicates with the second slideway, and the second slideway communicates with the third slideway;
the transmission assembly comprises a transmission block, the gravity sensing assembly comprises a weight block, the telescopic block slidingly connects with the first slideway, the transmission block slidingly connects with the second slideway, the weight block slidingly connects with the third slideway, an end of the transmission block and the weight block are transmittably connected, another end of the transmission block and the telescopic block are transmittably connected, when switching from the first state to the second state, the weight block is forced by the external force so as to slide along the third direction and make the transmission block slide along the second direction, so that the transmission block drives the telescopic block into the elongated state from the contracted state.

In an embodiment, the weight block and the transmission block are transmittably connected by a transmission chain, the telescopic block is slidingly abutted against the transmission block; a first predetermined angle is formed between the first slideway and the second slideway;
the transmission block has a first guiding surface disposed close to a lateral surface of the telescopic block, the telescopic block has a second guiding surface matched with the first guiding surface and disposed at one side close to the transmission block, the transmission block is abutted against the telescopic block by the first guiding surface and the second guiding surface, a second angle is formed between the first guiding surface or the second guiding surface, and the second slideway, a degree of the second angle is less than a degree of the first angle.

In an embodiment, the transmission assembly comprises a first elastic component, the first elastic component is disposed between an inner wall of the second slideway at one side close to the weight block and the transmission block, the first elastic component is disposed along the second direction, an end of the first elastic component is connected with the second slideway, another end of the first elastic component is connected with the transmission block;

the gravity sensing assembly comprises a second elastic component, the second elastic component is disposed between an inner wall of the third slideway and the weight block, and the second elastic component is disposed along the third direction;

in the first state, the second elastic component is in a pre-compressed state, and the telescopic block is in the contracted state;

in the second state, the second elastic component is in a compress-recovered state and abutted against the weight block, the first elastic component is in a stretched state and in connection with the transmission block, and the telescopic block is in the elongated state.

In an embodiment, the housing comprises a U-shaped reversing groove, the U-shaped reversing groove comprises a first channel and a second channel, an end of the first channel is communicated with the second channel, the second channel is communicated with the third slideway; an end of the transmission chain connects with the transmission block, and another end of the transmission chain penetrates through the U-shaped reversing groove and connects with the weight block.

In an embodiment, the first slideway comprises a main slideway and a resilience groove disposed inside the main slideway and extended along the first direction, the telescopic block comprises a stop portion, the stop portion is located inside the resilience groove, the resilience groove has a third elastic component disposed therein, the third elastic component is disposed between the stop portion and a lateral surface of the resilience groove away from the second slideway;

in the first state, the third elastic component is in a pre-compressed state or a naturally elongated state;

in the second state, the third elastic component is in a compress-recovered state, and an elastic potential energy of the third elastic component is greater than the elastic potential energy of the third elastic component in the first state.

In an embodiment, the resilience groove comprises a first resilience groove and a second resilience groove with similar structures respectively disposed on two opposite sidewalls of the first sliding groove, the third elastic component comprises a first elastic sub-component corresponding to the first resilience groove and a second elastic sub-component corresponding to the second resilience groove, the telescopic block comprises a first stop portion corresponding to the first resilience groove and a second stop portion corresponding to the second resilience groove.

In an embodiment, a rotation axis of a relative rotation of the frame body and the rotating assembly is perpendicular to the first direction.

In an embodiment, an angle between the first slideway and the second slideway is 90 degrees, and an angle between the second slideway and the third slideway is 90 degrees.

In an embodiment, the frame body has an abutting recess disposed at a position corresponding to the telescopic block of the impact resistant structure, and in the second state, an end of the telescopic block facing the frame body extends into the abutting recess to abut against the frame body.

The present application also provides a mobile terminal comprising a display panel and a terminal body, wherein the terminal body and the display panel are assembled into one body;

The display panel comprises:
a support structure comprising a frame body and a rotating assembly, wherein the frame body and the rotating assembly are relatively and rotatably connected, and the rotating assembly has a pivot cover disposed outside the rotating assembly;
a display panel body disposed on the frame body; and
an impact resistant structure embedded in the pivot cover, wherein the impact resistant structure comprises a gravity sensing assembly and a telescopic assembly, the gravity sensing assembly and the telescopic assembly are transmittably connected, the telescopic assembly comprises a telescopic block, and the telescopic block and the frame body are disposed opposite to each other, wherein the impact resistant structure is configured to be switched between a first state and a second state, the telescopic block is in a contracted state and spaced from the frame body in the first state, the telescopic block is in an elongated state and abutted against the frame body in the second state, the gravity sensing assembly is used to drive the telescopic block into the elongated state while being forced by an external force, so that the impact resistant structure is switched from the first state to the second state.

In an embodiment, the gravity sensing assembly and the telescopic assembly are transmittably connected by a transmission assembly;

the impact resistant structure comprises a housing, the housing comprises a first slideway extending along a first direction, a second slideway extending along a second direction, and a third slideway extending along a third direction, the first slideway communicates with the second slideway, and the second slideway communicates with the third slideway;

the transmission assembly comprises a transmission block, the gravity sensing assembly comprises a weight block, the telescopic block slidingly connects with the first slideway, the transmission block slidingly connects with the second slideway, the weight block slidingly connects with the third slideway, an end of the transmission block and the weight block are transmittably connected, another end of the transmission block and the telescopic block are transmittably connected, when switching from the first state to the second state, the weight block is forced by the external force so as to slide along the third direction and make the transmission block slide along the second direction, so that the transmission block drives the telescopic block into the elongated state from the contracted state.

In an embodiment, the weight block and the transmission block are transmittably connected by a transmission chain, the telescopic block is slidingly abutted against the transmission block; a first predetermined angle is formed between the first slideway and the second slideway;

the transmission block has a first guiding surface disposed close to a lateral surface of the telescopic block, the telescopic block has a second guiding surface matched with the first guiding surface and disposed at one side close to the transmission block, the transmission block is abutted against the telescopic block by the first guiding surface and the second guiding surface, a second angle is formed between the first guiding surface or the second guiding surface, and the second slideway, a degree of the second angle is less than a degree of the first angle.

In an embodiment, the transmission assembly comprises a first elastic component, the first elastic component is disposed between an inner wall of the second slideway at one side close to the weight block and the transmission block, the first elastic component is disposed along the second direction, an end of the first elastic component is connected with the second slideway, another end of the first elastic component is connected with the transmission block;

the gravity sensing assembly comprises a second elastic component, the second elastic component is disposed between an inner wall of the third slideway and the weight block, and the second elastic component is disposed along the third direction;

in the first state, the second elastic component is in a pre-compressed state, and the telescopic block is in the contracted state;

in the second state, the second elastic component is in a compress-recovered state and abutted against the weight block, the first elastic component is in a stretched state and in connection with the transmission block, and the telescopic block is in the elongated state.

In an embodiment, the housing comprises a U-shaped reversing groove, the U-shaped reversing groove comprises a first channel and a second channel, an end of the first channel is communicated with the second channel, the second channel is communicated with the third slideway; an end of the transmission chain connects with the transmission block, and another end of the transmission chain penetrates through the U-shaped reversing groove and connects with the weight block.

In an embodiment, the first slideway comprises a main slideway and a resilience groove disposed inside the main slideway and extended along the first direction, the telescopic block comprises a stop portion, the stop portion is located inside the resilience groove, the resilience groove has a third elastic component disposed therein, the third elastic component is disposed between the stop portion and a lateral surface of the resilience groove away from the second slideway;

in the first state, the third elastic component is in a pre-compressed state or a naturally elongated state;

in the second state, the third elastic component is in a compress-recovered state, and an elastic potential energy of the third elastic component is greater than the elastic potential energy of the third elastic component in the first state.

In an embodiment, the resilience groove comprises a first resilience groove and a second resilience groove with similar structures respectively disposed on two opposite sidewalls of the first sliding groove, the third elastic component comprises a first elastic sub-component corresponding to the first resilience groove and a second elastic sub-component corresponding to the second resilience groove, the telescopic block comprises a first stop portion corresponding to the first resilience groove and a second stop portion corresponding to the second resilience groove.

In an embodiment, a rotation axis of a relative rotation of the frame body and the rotating assembly is perpendicular to the first direction.

In an embodiment, an angle between the first slideway and the second slideway is 90 degrees, and an angle between the second slideway and the third slideway is 90 degrees.

In an embodiment, the frame body has an abutting recess disposed at a position corresponding to the telescopic block of the impact resistant structure, and in the second state, an end of the telescopic block facing the frame body extends into the abutting recess to abut against the frame body.

Beneficial Effects

In the present application, through disposing an impact resistant structure on a pivot cover of a display panel, a telescopic block of the impact resistant structure is disposed toward the frame body, a corresponding gravity sensing assembly drives the telescopic block to switch between an elongated state and a contracted state after the pivot cover of the display panel is impacted, so that when the foldable mobile device is impacted, the pivot cover is directly connected to the frame body, and an impact force forcing on the pivot cover is transmitted to the frame body through the impact resistant structure. The impact force, which is transmitted to the frame body through the rotating assembly, of the pivot cover is dispersed, thereby reducing the deformation probability of the rotating assembly, improving the lifetime of the rotating assembly, and enhancing the user experience.

BRIEF DESCRIPTION OF DRAWINGS

FIG. 5b is an enlarged diagram of B shown in FIG. 5a;

DETAILED DESCRIPTION OF PREFERRED EMBODIMENTS

The present application provides a display panel and a mobile terminal. In order to make the purpose, technical solution and effect of the present application clearer and more definite, the following is a further detailed description of the present application with reference to the accompanying drawings and embodiments. It should be understood that the specific embodiments described herein are intended to explain the present application only and are not intended to limit the present application.

Embodiments of the present application provide a display panel and a mobile terminal. Each of the embodiments is described in detail below. It should be noted that the order of description of the following embodiments is not intended to limit the preferred order of embodiments.

Currently, a foldable mobile device is usually set with a support mechanism, which is usually a rotating mechanism connecting two parts of a middle frame, and a flexible screen is set on the support mechanism to implement the closing or unfolding of the foldable mobile device, but in the closed state or the unfolded state when the foldable mobile device falls from a height and the pivot cover first touches the ground and forced by an impact force, the impact force will be transmitted to the rotating mechanism through the pivot cover of the rotating mechanism (the pivot cover is only connected to the middle frame through the rotating assembly) and then to the middle frame. When the rotating mechanism is forced by the impact force, it is prone to unsatisfactory issues, such as derailment of pivot, broken shaft, and bent track, which will affect the folding function of the foldable mobile device and eventually affect the normal folding of the mobile phone and reduce the user experience.

In order to solve the above technical problems, the present application provides a display panel. Refer to the following embodiments in specific.

Figure 1:
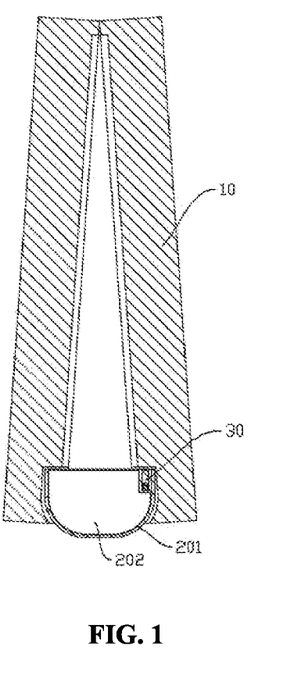
FIG. 1 is a schematic diagram of the structure of a support structure of a display panel provided by an embodiment of the present application.
Figure 2:
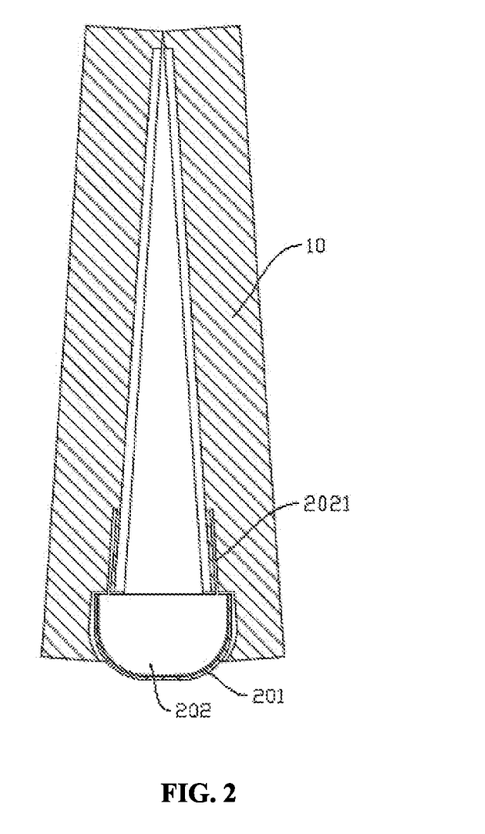
FIG. 2 is a schematic diagram of the structure of a support structure of a display panel provided by an embodiment of the present application.

Embodiments of the present application provide a display panel. In specific, with references of FIGS. 1 to 4, the display panel includes:

a support structure including a frame body 10 and a rotating assembly 202, wherein the frame body 10 and the rotating assembly 202 are relatively and rotatably connected, and the rotating assembly 202 has a pivot cover 201 disposed outside the rotating assembly 202;

Specifically, the frame body 10 can be two frame bodies, the sizes of the two frame bodies 10 can be equal, the two frame bodies 10 are connected with the rotating assembly 202, so that the two frame bodies 10 can be respectively rotated relative to the rotating assembly 202, and the manner of the rotation of the frame body 10 is rotating about a rotation axis of the rotating assembly 202.

Specifically, the rotating assembly 202 can be a hinged structure capable of implementation of being connected for rotation, the rotating assembly 202 can include four rotating arms 2021. An end of the rotating arm 2021 is fixed to the frame body 10, another end of the rotating arm 2021 is rotatably connected to the rotation axis of the rotating assembly 202, so that the frame body 10 can be rotated around the rotation axis of the rotating assembly 202.

a display panel body disposed on the frame body 10;

Specifically, the display panel body can be a flexible panel, it can be an organic electroluminescence display (OLED) flexible display panel in specific. The display panel body is disposed on the support structure, which can be understood to cover the support structure. The display panel body is attached to the frame body 10, so that the rotation of the two frame bodies 10 relative to the rotating assembly 202 enables the display panel to implement folding and unfolding functions.

Figure 3:
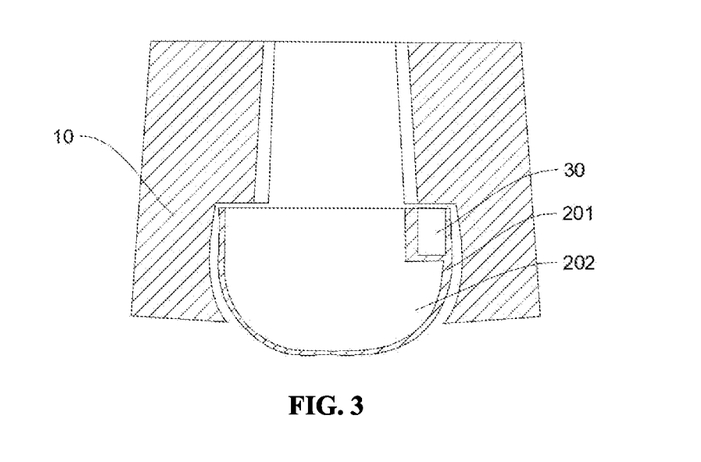
FIG. 3 is a schematic diagram of the structure of an impact resistant structure of a display panel in a first state provided by an embodiment of the present application.
Figure 4:
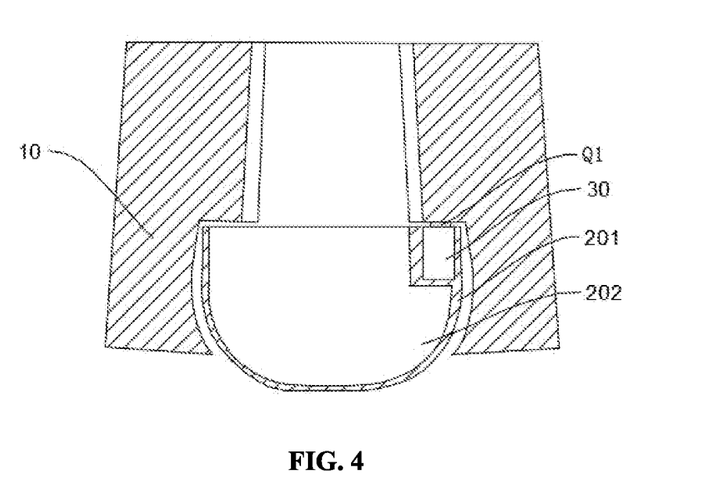
FIG. 4 is a schematic diagram of the structure of an impact resistant structure of a display panel in a second state provided by an embodiment of the present application.

Specifically, as shown in FIG. 1 and FIG. 2, an outer wall, which is not in contact with the display panel body, of the rotating assembly 202 covers the pivot cover 201. The pivot cover 201 is not in contact with the frame body 10.

an impact resistant structure 30, embedded in the pivot cover 201, wherein the impact resistant structure 30 includes a gravity sensing assembly and a telescopic assembly, the gravity sensing assembly and the telescopic assembly are transmittably connected, the telescopic assembly includes a telescopic block Q1, and the telescopic block Q1 and the frame body 10 are disposed opposite to each other;

Wherein, as shown in FIG. 3 and FIG. 4, the impact resistant structure 30 is configured to be switched between a first state and a second state. As shown in FIG. 3, the telescopic block Q1 is in a contracted state, and the telescopic block Q1 is spaced from the frame body 10 in the first state. As shown in FIG. 4, the telescopic block Q1 is in an elongated state, and the telescopic block Q1 is abutted against the frame body 10 in the second state. The gravity sensing assembly is used to drive the telescopic block Q1 into the elongated state while being forced by an external force, so that the impact resistant structure 30 is switched from the first state to the second state.

Specifically, the impact resistant structure 30 is embedded in the pivot cover 201, for example the impact resistant structure 30 can be disposed at a position on the pivot cover 201 close to the rotating arm 2021. The number of the impact resistant structure 30 is not limited. The number of impact resistant structures can be the same as the number of rotating arms 2021, which are connected to the frame body 10, of the rotating assembly 202, or can be twice the number of the rotating arms 2021. In specific, it can be set according to the actual situation of production.

For example, in the first state of the impact resistant structure 30, an end surface of the telescopic block Q1 towards a free end of the frame body 10 is located on a plane of the pivot cover 201 where the impact resistant structure 30 is embedded or located in the plane of the pivot cover 201 where the impact resistant structure 30 is embedded, which can serve to prevent the telescopic block Q1 from protruding on the plane of the pivot cover 201 in the contracted state and affecting folding of the display panel or the flatness of the display surface in a unfolded state of the display panel.

Specifically, the impact resistant structure 30 may be a mechanical transmission structure, and the gravity sensing assembly can include a slideway with an angle to a forced direction, a weight block Q3 capable of sliding along the slideway, and a compression spring which is compressible in a sliding direction of the weight block Q3; when the display panel falls and the pivot cover 201 lands, such that the weight block Q3 in the impact resistant structure 30 continues to slide along the slideway under the action of gravitational inertia and simultaneously compresses the spring to generate displacement. The weight block Q3 connects with the telescopic block Q1, the displacement of the weight block Q3 makes the telescopic block Q1 elongate, so that the telescopic block Q1 abuts against the frame body 10 to implement a direct connection between the pivot cover 201 and the frame body 10.

It can be understood that through disposing the impact resistant structure 30 on the pivot cover 201 of the display panel, the telescopic block Q1 of the impact resistant structure 30 is disposed toward the frame body 10, the corresponding gravity sensing assembly drives the telescopic block Q1 to switch between an elongated state and a contracted state after the pivot cover 201 of the display panel is impacted, so that when the foldable mobile device is impacted, the pivot cover 201 is directly connected to the frame body 10, and an impact force forcing on the pivot cover 201 is transmitted to the frame body 10 through the impact resistant structure 30. The impact force, which is transmitted to the frame body 10 through the rotating assembly 202, of the pivot cover 201 is dispersed, thereby reducing the deformation probability of the rotating assembly 202, improving the lifetime of the rotating assembly 202, and enhancing the user experience.

In an embodiment, as shown in FIG. 5a, FIG. 5b, FIG. 6 and FIG. 7, the gravity sensing assembly and the telescopic assembly are connected by a transmission assembly.

The impact resistant structure 30 includes a housing, the housing includes a first slideway T1 extending along a first direction F1, a second slideway T2 extending along a second direction F2, and a third slideway T3 extending along a third direction F3, the first slideway T1 communicates with the second slideway T2, and the second slideway T2 communicates with the third slideway T3.

The transmission assembly includes a transmission block Q2, the gravity sensing assembly includes a weight block Q3, the telescopic block Q1 slidingly connects with the first slideway T1, the transmission block Q2 slidingly connects with the second slideway T2, the weight block Q3 slidingly connects with the third slideway T3, an end of the transmission block Q2 and the weight block Q3 are transmittably connected, another end of the transmission block Q2 and the telescopic block Q1 are transmittably connected, when switching from the first state to the second state, the weight block Q3 is forced by the external force so as to slide along the third direction F3 and make the transmission block Q2 slide along the second direction F2, so that the transmission block Q2 drives the telescopic block Q1 into the elongated state from the contracted state.

Specifically, the extending directions of the first slideway T1 and the second slideway T2 are not limited, the angles between the first direction F1, the second direction F2, and the third direction F3 are not limited, either, and structures that enable the weight block Q3 to drive the telescopic block Q1 to be displaced by gravitational inertia are within the protection scope of the present application.

Specifically, the first slideway T1 and the second slideway T2 are directly communicated with each other, and the second slideway T2 and the third slideway T3 are communicated by a transmission channel T4 of a transmission chain 400.

Specifically, the specific shapes of the weight block Q3 and the transmission block Q2 are not limited, as long as the weight block Q3 and the transmission block Q2 can slide in the corresponding third slideway T3 and the second slideway T2.

Figure 5A:
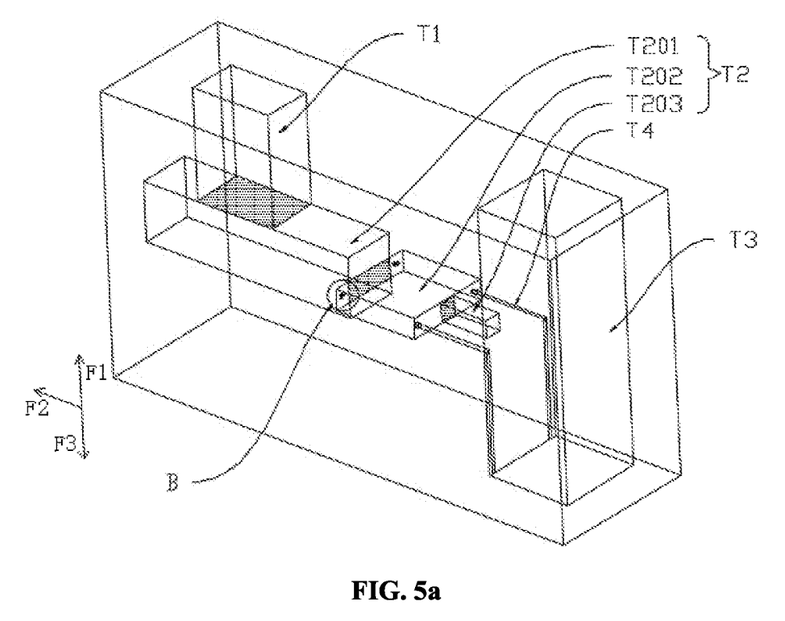
FIG. 5a is a schematic diagram of the structure of a housing of an impact resistant structure provided by an embodiment of the present application.
Figure 5B:
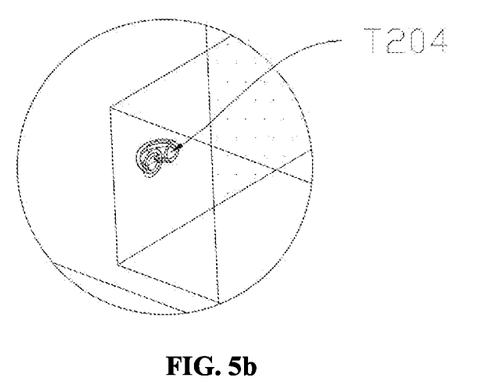

For example, as shown in FIG. 5a and FIG. 5b, the second slideway T2 can be divided into a first connection channel T201 and a second connection channel T202, wherein the first connection channel T201 is close to the first slideway T1 and the second connection channel T202 is close to the third slideway T3. The transmission block Q2 includes an abutting body Q201 located in the first connection channel T201 and a semi-encapsulated connection portion at least partially located in the second connection channel T202, and the semi-encapsulated connection portion includes two vertical rods Q202 connected with the abutting body Q201 and a horizontal rod Q203 connected with the two vertical rods Q202.

The second connection channel T202 has a U-shaped reversing groove T204 disposed on a sidewall away from the third slideway T3, as shown in FIG. 5b, the U-shaped reversing groove T204 includes a first channel and a second channel, an end of the first channel is communicated with the second connection channel T202 of the second channel, the second channel is communicated with the third slideway T3 by the transmission channel T4; an end of the transmission chain 400 connects with the horizontal rod Q203, and another end penetrates through the U-shaped reversing groove T204 and connects with the weight block Q3 to implement the reverse linkage of the transmission block Q2.

Specifically, the transmission block Q2 can be transmittably connected with the telescopic block Q1 by means of abutting. The transmission block Q2 has a guiding surface, such that the telescopic block Q1 slides along the guiding surface at the intersection of the first slideway T1 and the second slideway T2. The first slideway T1 and the second slideway T2 have a first predetermined angle therebetween, a second angle is formed between the guiding surface and the second slideway T2, and a degree of the second angle is less than a degree of the first angle.

It can be understood that by moving the weight block Q3, the transmission block Q2 is driven to move towards the telescopic block Q1, such that the transmission block Q2 lifts the telescopic block Q1 so as to implement an elongation effect of the telescopic block Q1, so that the telescopic block Q1 and the frame body 10 are connected to effectively disperse the pressure transmitted to the frame body 10 through the rotating assembly 202 after the pivot cover 201 receives the impact force, thereby increasing the lifetime of the transmission assembly.

Figure 6:
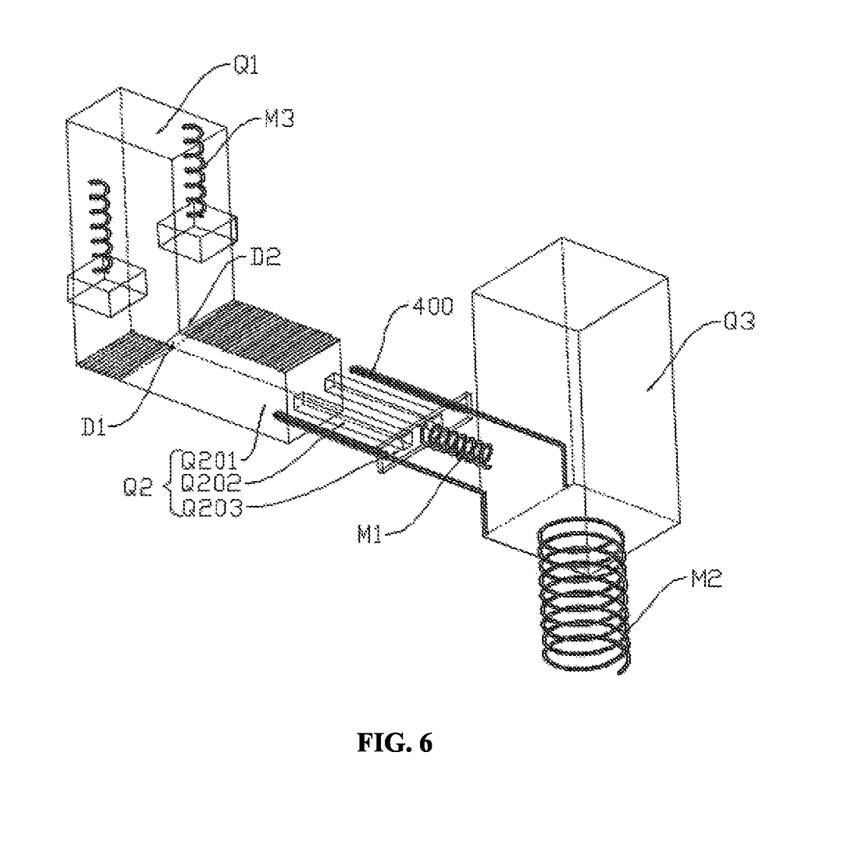
FIG. 6 is a schematic diagram of the connection structure of each assembly of an impact resistant structure provided by an embodiment of the present application.

In an embodiment, as shown in FIG. 6, the weight block Q3 and the transmission block Q2 are transmittably connected by a transmission chain 400, the telescopic block Q1 is slidingly abutted against the transmission block Q2; a first predetermined angle is formed between the first slideway T1 and the second slideway T2.

As shown in FIG. 6, the transmission block Q2 has a first guiding surface D1 disposed close to a lateral surface of the telescopic block Q1, the telescopic block Q1 has a second guiding surface D2 matched with the first guiding surface D1 and disposed at one side close to the transmission block Q2, the transmission block Q2 is abutted against the telescopic block Q1 by the first guiding surface D1 and the second guiding surface D2, a second angle is formed between the first guiding surface D1 or the second guiding surface D2, and the second slideway T2, a degree of the second angle is less than a degree of the first angle.

Specifically, the transmission chain 400 can be a thin rope, or a chain with no telescopic performance, a belt, etc.

Specifically, the degree of the second angle is less than the degree of the first angle, such that when the transmission block Q2 moves towards the direction of the telescopic block Q1 in the second slideway T2, the second guiding surface D2 of the telescopic block Q1 abuts against the first guiding surface D1 of the transmission block Q2, and the telescopic block Q1 slides along a slope of the first guiding surface D1, so that the telescopic block Q1 is lifted to slide along the first slideway T1 so as to implement an elongation effect of the telescopic block Q1.

Specifically, the dimensions and the sizes of the transmission block Q2 and the telescopic block Q1 are not limited, which are within the protection scope of the present application as long as the above-mentioned transmission effect can be achieved.

It can be understood that by utilizing this technical means, the displacement of the weight block Q3 can be timely feedback to the telescopic block Q1 to implement the elongation of the telescopic block Q1 and can fast and timely disperse the pressure transmitted to the frame body 10 through the rotating assembly 202 after the pivot cover 201 is forced by the impact force, thereby increasing the lifetime of the transmission assembly.

Figure 7:
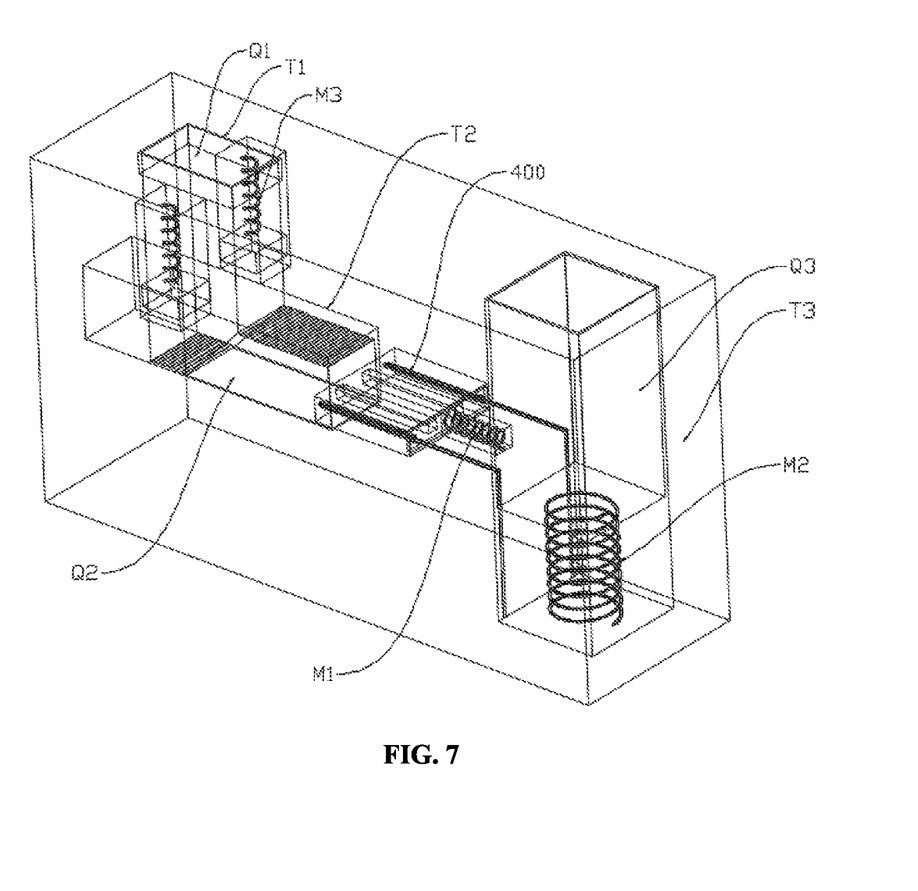
FIG. 7 is a schematic diagram of the structure of an impact resistant structure provided by an embodiment of the present application.
Figure 8A:
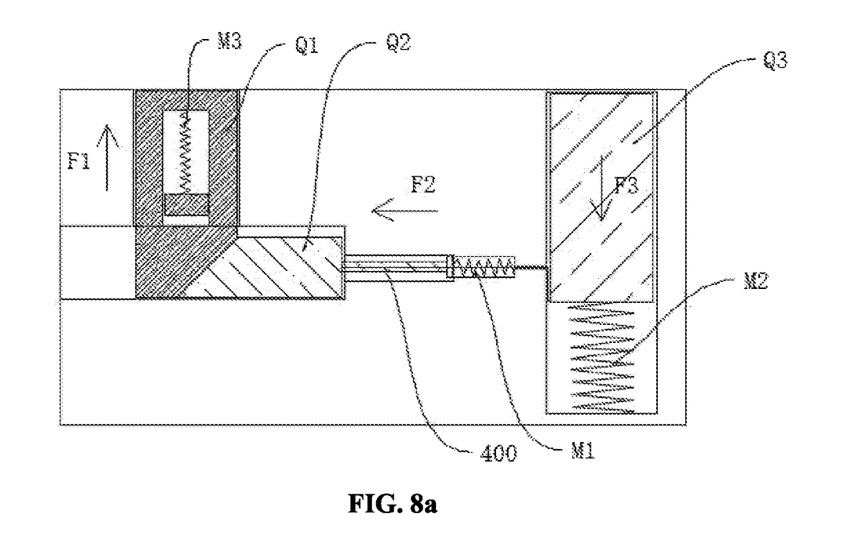
FIG. 8a is a schematic diagram of the structure of each assembly of an impact resistant structure in a contracted state provided by an embodiment of the present application.
Figure 8B:
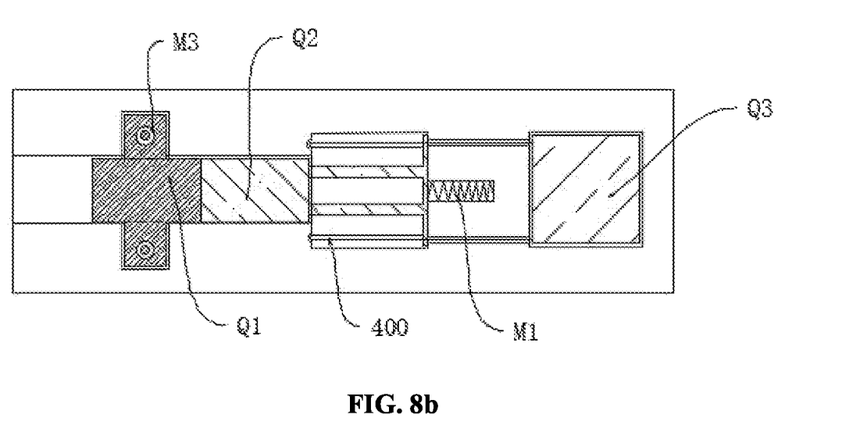
FIG. 8b is a top view of the structure of each assembly of an impact resistant structure in a contracted state provided by an embodiment of the present application.
Figure 9A:
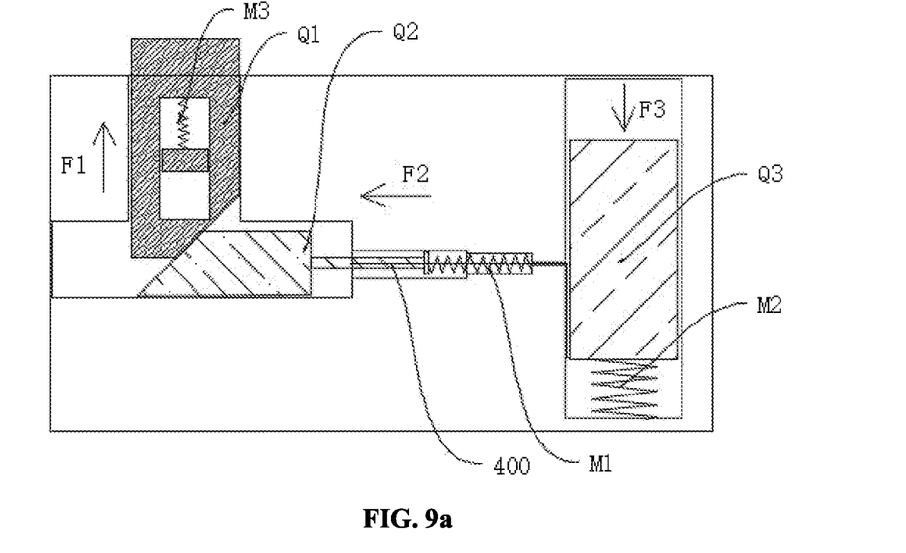
FIG. 9a is a schematic diagram of the structure of each assembly of an impact resistant structure in the process of changing from a contracted state to an elongated state provided by an embodiment of the present application.
Figure 9B:
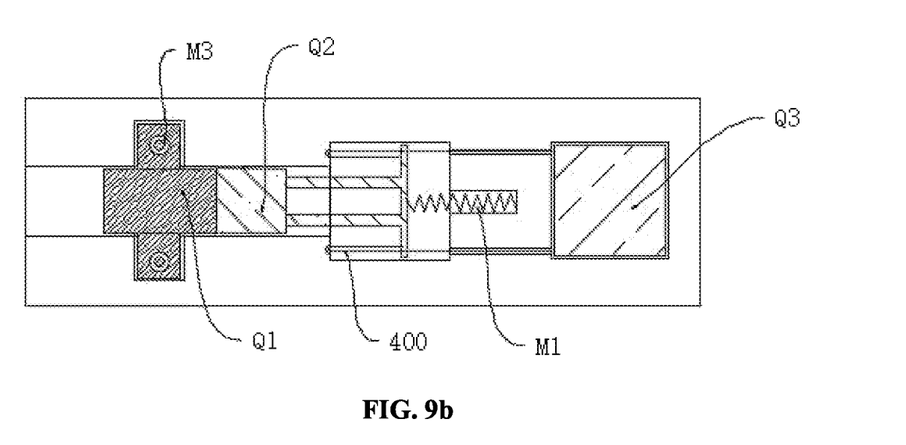
FIG. 9b is a top view of the structure of each assembly of an impact resistant structure in the process of changing from a contracted state to an elongated state provided by an embodiment of the present application.
Figure 10A:
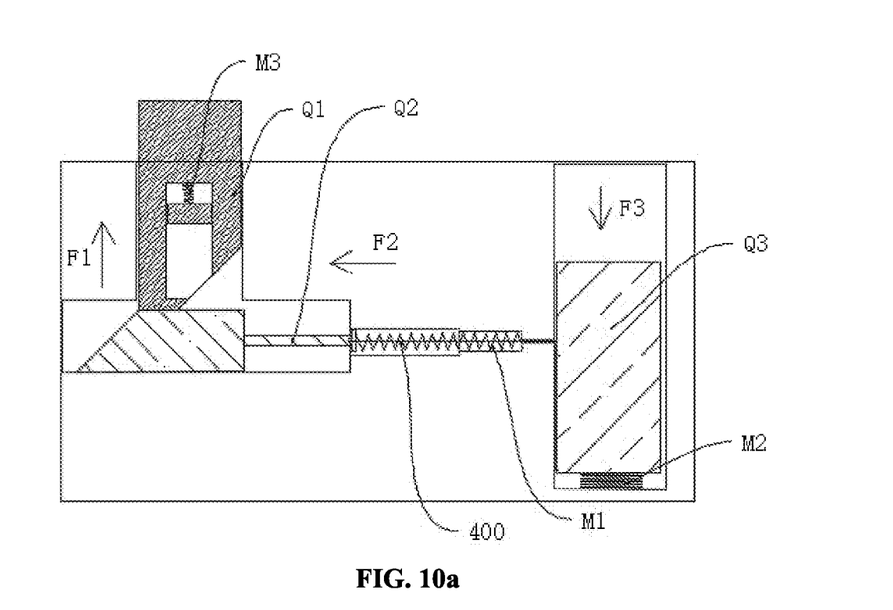
FIG. 10a is a schematic diagram of the structure of each assembly of an impact resistant structure in an elongated state provided by an embodiment of the present application.
Figure 10B:
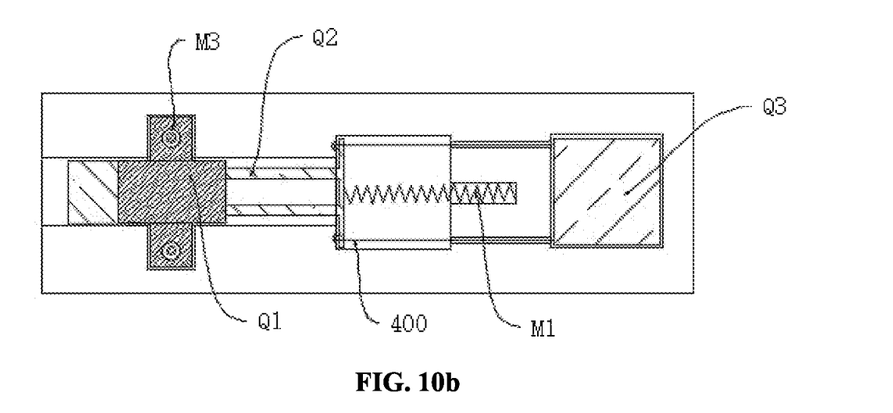
FIG. 10b is a top view of the structure of each assembly of an impact resistant structure in an elongated state provided by an embodiment of the present application

In an embodiment, as shown in FIG. 6 and FIG. 7, the transmission assembly includes a first elastic component M1. The first elastic component M1 is disposed between an inner wall of the second slideway T2 at one side close to the weight block Q3 and the transmission block Q2. The first elastic component M1 is disposed along the second direction F2. An end of the first elastic component M1 is connected with the second slideway T2, and another end of the first elastic component M1 is connected with the transmission block Q2.

The gravity sensing assembly includes a second elastic component M2. The second elastic component M2 is disposed between an inner wall of the third slideway T3 and the weight block Q3, and the second elastic component M2 is disposed along the third direction F3.

In the first state, the second elastic component M2 is in a pre-compressed state, and the telescopic block Q1 is in the contracted state.

In the second state, the second elastic component M2 is in a compress-recovered state and abutted against the weight block Q3, the first elastic component M1 is in a stretched state and in connection with the transmission block Q2, and the telescopic block Q1 is in the elongated state.

Specifically, the first elastic component M1 and the second elastic component M2 can both be compression springs.

In the above embodiment, as shown in FIG. 5a and FIG. 7, wherein a first elastic channel T203 is disposed on a lateral surface of the second connection channel T202 close to the third slideway T3. The first elastic component M1 is disposed in the first elastic channel T203. An end of the first elastic component M1 is fixed with an inner wall of the first elastic channel T203, and another end of the first elastic component M1 is fixed with the horizontal rod Q203 of the transmission block Q2.

The transmission processes of the impact resistant structure 30 of this embodiment from the first state to the second state are shown in FIG. 8a, FIG. 8b, FIG. 9a, FIG. 9b, FIG. 10a, and FIG. 10b. The weight block Q3 is affected by its own inertial force to slide along the third slideway T3 and compress the second elastic component M2 which is in a pre-compressed state, so that the elastic potential energy of the second elastic component M2 is gradually increased and the weight block Q3 is displaced. The displacement of the weight block Q3 is transmitted by the transmission chain 400. The transmission block Q2 is driven to move to be close to the telescopic block Q1. The displacement of the transmission block Q2 lifts the telescopic block Q1. The first elastic component M1 is gradually pulled up from its initial state (the initial state can be a naturally elongated state or a pre-stretched state). The elastic potential energy of the first elastic component M1 is gradually increased to implement the elongation of the telescopic block Q1.

The transmission processes of the impact resistant structure 30 of this embodiment from the second state to the first state are as follows: after the inertial forces of the second elastic component M2 and the weight block Q3 reach instantaneous equilibrium, the second elastic component M2 springs back and drives the weight block Q3 to move toward a direction away from the second elastic component M2, the first elastic component M1 pulls back the transmission block Q2 in a direction close to the third slide T3, and the telescopic block Q1 implement a retraction to implement the transition from the second state to the first state.

It can be understood that by utilizing this technical means and through the cooperation of the gravity sensing assembly and the transmission assembly, the displacement of the weight block Q3 can be timely feedback to the telescopic block Q1 to implement the switching between the elongated state and the contracted state of the telescopic block Q1 and can fast and timely disperse the pressure transmitted to the frame body 10 through the rotating assembly 202 after the pivot cover 201 is forced by the impact force, thereby increasing the lifetime of the transmission assembly.

In an embodiment, as shown in FIG. 5a, FIG. 5b, and FIG. 7, the housing includes a U-shaped reversing groove T204. The U-shaped reversing groove T204 includes a first channel and a second channel. An end of the first channel is communicated with the second channel, and the second channel is communicated with the third slideway T3; an end of the transmission chain 400 connects with the transmission block Q2, and another end of the transmission chain 400 passes through the U-shaped reversing groove T204 and connects with the weight block Q3.

It can be understood that by disposing the U-shaped reversing groove T204, the change of transmission direction of the transmission block Q2 is implemented which makes the disposing of the impact resistant structure 30 more reasonable, thereby implementing the driving of the gravity sensing assembly to the telescopic block Q1 and the switching between the elongated state and the contracted state of the telescopic block Q1.

In an embodiment, as shown in FIG. 5a and FIG. 7, the first slideway T1 includes a main slideway T101 and a resilience groove T102 disposed inside the main slideway T101 and extended along the first direction F1. The telescopic block Q1 includes a stop portion. The stop portion is located inside the resilience groove T102. The resilience groove T102 has a third elastic component M3 disposed therein. The third elastic component M3 is disposed between the stop portion and a lateral surface of the resilience groove T102 away from the second slideway T2.

In the first state, the third elastic component M3 is in a pre-compressed state or a naturally elongated state.

In the second state, the third elastic component M3 is in a compress-recovered state, and an elastic potential energy of the third elastic component M3 is greater than the elastic potential energy of the third elastic component M3 in the first state.

Specifically, during the transition from the first state to the second state, the transmission block Q2 lifts the telescopic block Q1, and simultaneously the stop portion of the telescopic block Q1 compresses the third elastic component M3, such that the elastic potential energy of the third elastic component M3 is gradually increased; during the transition from the second state to the first state, the third elastic component M3 springs back. By pushing the stop portion, the telescopic block Q1 is returned to the contracted state.

It can be understood that by setting the first slideway T1 as the structure of the main slideway T101 matched with the resilience groove T102, the stop portion of the telescopic block Q1 extends into the resilience groove T102, which can better assist the telescopic block Q1 to convert from the elongated state into the contracted state with the assist of the third elastic component M3, thereby preventing the telescopic block Q1 from extending out of the housing for too long to affect the normal rotation of the frame body 10.

In an embodiment, as shown in FIG. 7, the resilience groove T102 includes a first resilience groove and a second resilience groove with similar structures respectively disposed on two opposite sidewalls of the first sliding groove.

The third elastic component M3 includes a first elastic sub-component corresponding to the first resilience groove and a second elastic sub-component corresponding to the second resilience groove. The telescopic block Q1 includes a first stop portion corresponding to the first resilience groove and a second stop portion corresponding to the second resilience groove.

Specifically, the first stop portion is disposed in the first resilience groove. The first resilience groove has a first elastic sub-component disposed therein. The first elastic sub-component is disposed between the first stop portion and a lateral surface, which is away from the second slideway T2, of the first resilience groove; the second stop portion is disposed in the second resilience groove. The second resilience groove has a second elastic sub-component disposed therein. The second elastic sub-component is disposed between the second stop portion and a lateral surface, which is away from the second slideway T2, of the first resilience groove.

In the first state, the first elastic sub-component and second elastic sub-component are in a pre-compressed state or a naturally elongated state.

In the second state, the first elastic sub-component and the second sub-component are in a compress-recovered state, and an elastic potential energy of the third elastic component M3 is greater than the elastic potential energy of the third elastic component M3 in the first state.

It can be understood that by symmetrically disposing the first resilience groove and the second resilience groove, the slide of the telescopic block Q1 is more smooth, and the stability of the structure is higher.

In an embodiment, a rotation axis of a relative rotation of the frame body 10 and the rotating assembly 202 is perpendicular to the first direction F1.

It can be understood that the first direction F1 is the telescopic direction of the telescopic block Q1. The first direction F1 is set as a position perpendicular to the rotation axis. It should be noted that the rotation axis is in a direction where a relative rotation of the frame body 10 and the rotating assembly 202 is occurred, which can make the connection effect of the telescopic block Q1 and the frame body 10 optimal, so that the best effect of dispersing the impact force through the impact resistant structure 30 is achieved.

In an embodiment, an angle between the first slideway T1 and the second slideway T2 is 90 degrees (90°), and an angle between the second slideway T2 and the third slideway T3 is 90 degrees (90°)

In an embodiment, the frame body 10 has an abutting recess disposed at a position corresponding to the telescopic block Q1 of the impact resistant structure 30, and in the second state, an end of the telescopic block Q1 facing the frame body 10 extends into the abutting recess to abut against the frame body 10.

Specifically, a bottom surface of the abutting recess or a lateral surface of the telescopic block Q1 facing the frame body 10 can be a rough surface.

It can be understood that by disposing an abutting groove on the frame body 10, the contact area between the telescopic block Q1 and the frame body 10 can be effectively increased, and the reliability of the connection between the impact resistant structure 30 and the frame body 10 can be enhanced.

In addition, the embodiments of the present application also provide a mobile terminal including a display panel as described in any one of the above-mentioned embodiments and a terminal body. The terminal body and the display panel are assembled into one body or combined as an integral part.

It will be understood that equivalent replacements or changes can be made by a person of ordinary skill in the art according to the technical solution of the present application and its inventive concept, and all such changes or replacements shall fall within the protection scope of the appended claims of the present application.

What is claimed is:

1. A display panel, comprising:
   a support structure comprising two frame bodies and a rotating assembly, wherein the two frame bodies and the rotating assembly are relatively and rotatably connected, and the rotating assembly has a pivot cover disposed outside the rotating assembly;
   a display panel body disposed on each of the two frame bodies; and
   an impact resistant structure embedded in the pivot cover, wherein the impact resistant structure comprises a gravity sensing assembly and a telescopic assembly, the gravity sensing assembly and the telescopic assembly are transmittably connected, the telescopic assembly comprises a telescopic block, and the telescopic block and the frame body are disposed opposite to each other,
   wherein the impact resistant structure is configured to be switched between a first state and a second state, the telescopic block is in a contracted state and spaced from the frame body in the first state, the telescopic block is in an elongated state and abutted against the frame body in the second state, and the gravity sensing assembly is used to drive the telescopic block into the elongated state while being forced by an external force, so that the impact resistant structure is switched from the first state to the second state;
   wherein the rotating assembly comprises four rotating arms, an end of each of the four rotating arms is fixed to a corresponding one of the two frame bodies, and another end of the rotating arm is rotatably connected to a rotation axis of the rotating assembly.

2. The display panel as claimed in claim 1, wherein the gravity sensing assembly and the telescopic assembly are transmittably connected by a transmission assembly;
   the impact resistant structure comprises a housing, the housing comprises a first slideway extending along a first direction, a second slideway extending along a second direction, and a third slideway extending along a third direction, the first slideway communicates with the second slideway, and the second slideway communicates with the third slideway;
   the transmission assembly comprises a transmission block, the gravity sensing assembly comprises a weight block, the telescopic block slidingly connects with the first slideway, the transmission block slidingly connects with the second slideway, the weight block slidingly connects with the third slideway, an end of the transmission block and the weight block are transmittably connected, another end of the transmission block and the telescopic block are transmittably connected, when switching from the first state to the second state, the weight block is forced by the external force so as to slide along the third direction and make the transmission block slide along the second direction, so that the transmission block drives the telescopic block into the elongated state from the contracted state.

3. The display panel as claimed in claim 2, wherein the weight block and the transmission block are transmittably connected by a transmission chain, the telescopic block is slidingly abutted against the transmission block; a first predetermined angle is formed between the first slideway and the second slideway;

the transmission block has a first guiding surface disposed close to a lateral surface of the telescopic block, the telescopic block has a second guiding surface matched with the first guiding surface and disposed at one side close to the transmission block, the transmission block is abutted against the telescopic block by the first guiding surface and the second guiding surface, a second angle is formed between the first guiding surface or the second guiding surface, and the second slideway, a degree of the second angle is less than a degree of the first angle.

4. The display panel as claimed in claim 3, wherein the transmission assembly comprises a first elastic component, the first elastic component is disposed between an inner wall of the second slideway at one side close to the weight block and the transmission block, the first elastic component is disposed along the second direction, an end of the first elastic component is connected with the second slideway, another end of the first elastic component is connected with the transmission block;

the gravity sensing assembly comprises a second elastic component, the second elastic component is disposed between an inner wall of the third slideway and the weight block, and the second elastic component is disposed along the third direction;

in the first state, the second elastic component is in a pre-compressed state, and the telescopic block is in the contracted state;

in the second state, the second elastic component is in a compress-recovered state and abutted against the weight block, the first elastic component is in a stretched state and in connection with the transmission block, and the telescopic block is in the elongated state.

5. The display panel as claimed in claim 4, wherein the housing comprises a U-shaped reversing groove, the U-shaped reversing groove comprises a first channel and a second channel, an end of the first channel is communicated with the second channel, the second channel is communicated with the third slideway; an end of the transmission chain connects with the transmission block, and another end of the transmission chain penetrates through the U-shaped reversing groove and connects with the weight block.

6. The display panel as claimed in claim 4, wherein the first slideway comprises a main slideway and a resilience groove disposed inside the main slideway and extended along the first direction, the telescopic block comprises a stop portion, the stop portion is located inside the resilience groove, the resilience groove has a third elastic component disposed therein, the third elastic component is disposed between the stop portion and a lateral surface of the resilience groove away from the second slideway;

in the first state, the third elastic component is in a pre-compressed state or a naturally elongated state;

in the second state, the third elastic component is in a compress-recovered state, and an elastic potential energy of the third elastic component is greater than the elastic potential energy of the third elastic component in the first state.

7. The display panel as claimed in claim 6, wherein the resilience groove comprises a first resilience groove and a second resilience groove with similar structures respectively disposed on two opposite sidewalls of the first sliding groove, the third elastic component comprises a first elastic sub-component corresponding to the first resilience groove and a second elastic sub-component corresponding to the second resilience groove, the telescopic block comprises a first stop portion corresponding to the first resilience groove and a second stop portion corresponding to the second resilience groove.

8. The display panel as claimed in claim 2, wherein a rotation axis of a relative rotation of the frame body and the rotating assembly is perpendicular to the first direction.

9. The display panel as claimed in claim 2, wherein an angle between the first slideway and the second slideway is 90 degrees, and an angle between the second slideway and the third slideway is 90 degrees.

10. The display panel as claimed in claim 1, wherein the frame body has an abutting recess disposed at a position corresponding to the telescopic block of the impact resistant structure, and in the second state, an end of the telescopic block facing the frame body extends into the abutting recess to abut against the frame body.

11. A mobile terminal comprising a display panel and a terminal body, wherein the terminal body and the display panel are assembled into one body;

the display panel comprises:
a support structure comprising a frame body and a rotating assembly, wherein the frame body and the rotating assembly are relatively and rotatably connected, and the rotating assembly has a pivot cover disposed outside the rotating assembly;
a display panel body disposed on the frame body; and
an impact resistant structure embedded in the pivot cover, wherein the impact resistant structure comprises a gravity sensing assembly and a telescopic assembly, the gravity sensing assembly and the telescopic assembly are transmittably connected, the telescopic assembly comprises a telescopic block, and the telescopic block and the frame body are disposed opposite to each other,
wherein the impact resistant structure is configured to be switched between a first state and a second state, the telescopic block is in a contracted state and spaced from the frame body in the first state, the telescopic block is in an elongated state and abutted against the frame body in the second state, the gravity sensing assembly is used to drive the telescopic block into the elongated state while being forced by an external force, so that the impact resistant structure is switched from the first state to the second state;
wherein the rotating assembly comprises four rotating arms, an end of each of the four rotating arms is fixed to the frame body, and another end of the rotating arm is rotatably connected to a rotation axis of the rotating assembly.

12. The mobile terminal as claimed in claim 11, wherein the gravity sensing assembly and the telescopic assembly are transmittably connected by a transmission assembly;
the impact resistant structure comprises a housing, the housing comprises a first slideway extending along a first direction, a second slideway extending along a second direction, and a third slideway extending along a third direction, the first slideway communicates with the second slideway, and the second slideway communicates with the third slideway;
the transmission assembly comprises a transmission block, the gravity sensing assembly comprises a weight block, the telescopic block slidingly connects with the first slideway, the transmission block slidingly connects with the second slideway, the weight block slidingly connects with the third slideway, an end of the transmission block and the weight block are transmittably connected, another end of the transmission block and the telescopic block are transmittably connected, when switching from the first state to the second state, the weight block is forced by the external force so as to slide along the third direction and make the transmission block slide along the second direction, so that the transmission block drives the telescopic block into the elongated state from the contracted state.

13. The mobile terminal as claimed in claim 12, wherein the weight block and the transmission block are transmittably connected by a transmission chain, the telescopic block is slidingly abutted against the transmission block; a first predetermined angle is formed between the first slideway and the second slideway;

the transmission block has a first guiding surface disposed close to a lateral surface of the telescopic block, the telescopic block has a second guiding surface matched with the first guiding surface and disposed at one side close to the transmission block, the transmission block is abutted against the telescopic block by the first guiding surface and the second guiding surface, a second angle is formed between the first guiding surface or the second guiding surface, and the second slideway, a degree of the second angle is less than a degree of the first angle.

14. The mobile terminal as claimed in claim 13, wherein the transmission assembly comprises a first elastic component, the first elastic component is disposed between an inner wall of the second slideway at one side close to the weight block and the transmission block, the first elastic component is disposed along the second direction, an end of the first elastic component is connected with the second slideway, another end of the first elastic component is connected with the transmission block;

the gravity sensing assembly comprises a second elastic component, the second elastic component is disposed between an inner wall of the third slideway and the weight block, and the second elastic component is disposed along the third direction;

in the first state, the second elastic component is in a pre-compressed state, and the telescopic block is in the contracted state;

in the second state, the second elastic component is in a compress-recovered state and abutted against the weight block, the first elastic component is in a stretched state and in connection with the transmission block, and the telescopic block is in the elongated state.

15. The mobile terminal as claimed in claim 14, wherein the housing comprises a U-shaped reversing groove, the U-shaped reversing groove comprises a first channel and a second channel, an end of the first channel is communicated with the second channel, the second channel is communicated with the third slideway; an end of the transmission chain connects with the transmission block, and another end of the transmission chain penetrates through the U-shaped reversing groove and connects with the weight block.

16. The mobile terminal as claimed in claim 14, wherein the first slideway comprises a main slideway and a resilience groove disposed inside the main slideway and extended along the first direction, the telescopic block comprises a stop portion, the stop portion is located inside the resilience groove, the resilience groove has a third elastic component disposed therein, the third elastic component is disposed between the stop portion and a lateral surface of the resilience groove away from the second slideway;

in the first state, the third elastic component is in a pre-compressed state or a naturally elongated state;

in the second state, the third elastic component is in a compress-recovered state, and an elastic potential energy of the third elastic component is greater than the elastic potential energy of the third elastic component in the first state.

17. The mobile terminal as claimed in claim 16, wherein the resilience groove comprises a first resilience groove and a second resilience groove with similar structures respectively disposed on two opposite sidewalls of the first sliding groove, the third elastic component comprises a first elastic sub-component corresponding to the first resilience groove and a second elastic sub-component corresponding to the second resilience groove, the telescopic block comprises a first stop portion corresponding to the first resilience groove and a second stop portion corresponding to the second resilience groove.

18. The mobile terminal as claimed in claim 12, wherein a rotation axis of a relative rotation of the frame body and the rotating assembly is perpendicular to the first direction.

19. The mobile terminal as claimed in claim 12, wherein an angle between the first slideway and the second slideway is 90 degrees, and an angle between the second slideway and the third slideway is 90 degrees.

20. The mobile terminal as claimed in claim 11, wherein the frame body has an abutting recess disposed at a position corresponding to the telescopic block of the impact resistant structure, and in the second state, an end of the telescopic block facing the frame body extends into the abutting recess to abut against the frame body.

* * * * *